United States Patent [19]
Murakami

[11] Patent Number: 5,355,150
[45] Date of Patent: Oct. 11, 1994

[54] SUB-SCREEN DATA STORAGE CONTROL UNIT

[75] Inventor: Tatsuo Murakami, Kanagawa, Japan

[73] Assignee: NEC Corporation, Tokyo, Japan

[21] Appl. No.: 19,119

[22] Filed: Feb. 17, 1993

[30] Foreign Application Priority Data

Feb. 18, 1992 [JP] Japan .................................. 4-029827

[51] Int. Cl.⁵ .............................................. G09G 1/02
[52] U.S. Cl. .................................... 345/201; 345/200
[58] Field of Search ............... 340/799, 798, 717, 723, 340/721; 395/164, 166; 345/201, 185, 189, 200, 1, 2, 115; 342/565, 567

[56] References Cited

U.S. PATENT DOCUMENTS

| | | | |
|---|---|---|---|
| 4,703,353 | 10/1987 | David | 358/140 |
| 4,806,921 | 2/1989 | Goodman et al. | 340/799 |
| 5,010,325 | 4/1991 | Zinchkovski | 340/799 |

Primary Examiner—Ulysses Weldon
Assistant Examiner—Doon Chow
Attorney, Agent, or Firm—Whitham, Curtis, Whitham & McGinn

[57] ABSTRACT

The sub-screen data storage control unit of the present invention is provided with writing address generation circuit means to generate writing addresses for the row direction and the column direction of the storage unit and reading address generation circuit to generate reading addresses for the row direction and the column direction of said storage unit. For division of sub-screen, it further comprises a selection signal generation circuit to generate a section selection signal to specify one of the divided sections obtained from division of the storage area of the storage, and address division circuit to sort row direction writing addresses and column direction writing addresses for each of the divided sections in the storage area according to the section selection signal from the selection signal generation circuit.

8 Claims, 7 Drawing Sheets

SUB-SCREEN DATA STORAGE CONTROL UNIT

BACKGROUNDS OF THE INVENTION

1. Field of the Invention

The present invention relates to a storage control unit which, when a small sub-screen is displayed in an original screen (main screen) of a display unit used for televisions and computers, writes/reads sub-screen data to be displayed on such sub-screen.

2. Description of the Prior Art

FIG. 6 shows an example where a sub-screen is displayed in a main screen of a display unit such as a television. The main screen 600 is displayed synchronizing with the horizontal synchronizing signal MHS and the vertical synchronizing signal MVS for the main screen. A sub-screen 700 of a smaller scale is displayed in this main screen 600. Video signals for the sub-screen 700 are converted to digital signals and stored as digital data in a storage incorporated in the display unit (described later). When the sub-screen 700 is displayed in the main screen 600, the sub-screen reading start signal VRS for vertical direction and the sub-screen reading start signal HRS for horizontal direction are raised to HIGH level and the digital signals stored in the storage are read out. The digital signals read out are converted to analogue signals before output so as to cause the sub-screen to be displayed.

FIG. 7 shows an example of a storage control unit for sub-screen data provided for sub-screen display as described above. Referring to FIG. 7, the unit is provided with a reloadable storage 300 to store sub-screen video signals which have been converted to digital data. A row decoder 310 decodes the output from a writing row counter 330 or a reading row counter 340 sent via a row switching circuit 320 so as to generate a row address signal AV. A column decoder 350 decodes the output from a writing column counter 370 or a reading column counter 380 sent via a column switching circuit 360 so as to generate a column address signal AH.

Since the sub-screen to be displayed in the main screen must be reduced to a small size, a reduction processing is required at this storage control unit for sub-screen data when writing data to the storage 300: the writing row counter 330 counts the sub-screen writing signal SWSn obtained by dividing the sub-screen horizontal synchronizing signal SHS by the reduction ratio in vertical direction (1/n). The writing column counter 370 counts the writing clock WCKn obtained by dividing the reading clock RCK by the reduction ratio (1/n).

On the other hand, when data in the storage 300 is read for display of a sub-screen, the reading row counter 340 counts the horizontal synchronizing signal MHS for the main screen. The reading column counter 380 counts the reading clock RCK. The row switching circuit 310 and the column switching circuit 360 switch the address signals for digital video data for the sub-screen between reading from and writing to the storage 300 using the switching signal RWC.

FIG. 8 shows the specific configuration of a writing row counter 330, a reading row counter 340 and a row switching circuit 320 for a storage control unit described above. Both of the writing row counter 330 and the reading row counter 340 comprise a series of connected flip-flops 120a to 120n. A set of the writing column counter 370, the reading column counter 380 and the column switching circuit 360 has the same configuration.

Referring to FIG. 7, brief description is given below for the operation of the storage control unit for sub-screen data. When the switching signal RWC has a logical value "1", a writing row address signal and a writing column address signal are output. The former is the decoded output from the writing row counter 330, which has counted the sub-screen writing signal SWSn obtained by dividing the sub-screen horizontal synchronizing signal SHS by the reduction ratio (1/n). The latter is the decoded output from the writing column counter 370, which has counted the writing clock WCKn obtained by dividing the reading clock RCK by the reduction ratio (1/n). To the area in the storage 300 defined by these low address signal and the column address signal, the digital video data, i.e. the digitally converted video signals for the sub-screen are written.

On the other hand, when the switching signal RWC has a logical value "0", the reading row counter 340 counts the horizontal synchronizing signal MHS for the main screen upon input of the sub-screen reading start signal VRS for vertical direction. The reading column counter 380 counts the reading clock RCK upon input of the horizontal sub-screen reading start signal HRS. The counted values are decoded to provide row address and column address signals. From the area in the storage 300 defined by these address signals, digital video data are read and converted to analogue signals for display of a sub-screen in the main screen. The vertical position of the sub-screen on main screen is controlled by the sub-screen reading start signal VRS and its horizontal position by the sub-screen reading start signal HRS.

The conventional storage control unit for sub-screen data as described above has the outputs from the writing column counter and the writing row counter and those from the reading column counter and the reading row counter decoded as they are before input to the storage. This results in that the area in the storage cannot be divided, and the number of sub-screens to be displayed on main screen is limited to one.

SUMMARY OF THE INVENTION

An object of the present invention is to provide a sub-screen data storage control unit which enables division of a sub-screen given in the main screen and display of different images on different sections.

According to a preferred embodiment of the present invention to attain the above object, a sub-screen data storage control unit for digital video data to be displayed on a sub-screen in a main screen of a display unit comprises a storage means to store digital video data for the sub-screen, a writing address generation means to count the horizontal synchronizing signal for the sub-screen divided corresponding to the vertical reduction ratio of the sub-screen and generate writing addresses for the row direction of the storage means by decoding the counted values, another writing address generation means to count the clock obtained by dividing the reading clock corresponding to the horizontal reduction ratio of the sub-screen and generate writing addresses for the column direction of the storage means by decoding the counted values, a reading address generation means to count the horizontal synchronizing signal for the main screen and generate reading addresses for the row direction of the storage means by decoding the counted values, another reading address generation means to count the reading clock and generate reading addresses for the column direction of the storage means by decoding the counted values, a selection signal generation means to generate section selection signals to specify one of the divided sections in the storage area of the storage means divided corresponding to the division of the sub-screen, and an address division means to provide at least one of the row direction writing address and the column direction writing address sent respectively from the row direction writing address generation means and the column direction writing address generation means to each of the divided sections in the storage area according to the section selection signal from the selection signal generation means.

According to a further preferred embodiment of a sub-screen data storage control unit, the address division means sorts the row direction writing address and the column direction writing address by replacing with the section selection signal the significant bits of the count values at the row direction writing address generation means or the column direction writing address generation means.

According to a still further preferred embodiment of a sub-screen data storage control unit, the selection signal generation means generates a vertical selection signal to specify one of the sections obtained from row direction division of the storage area and a horizontal selection signal to specify one of the sections obtained from column direction division of the storage area and the address division means replaces the significant bit of the count value at the row direction writing address generation means with the vertical selection signal and also replaces the significant bit of the count value at the column direction writing address generation means with the horizontal selection signal. Further, each of the address generation means comprises a counter and a decoder to decode the counter values.

According to another embodiment of a sub-screen data storage control unit of the present invention, the selection signal generation means generates a one-bit vertical selection signal to specify one of the two sections obtained from row direction division of the storage area and a one-bit horizontal selection signal to specify one of the two sections obtained from column direction division of the storage area and the address division means replaces the most significant bit of the count value at the row direction writing address generation means with the vertical selection signal and the most significant bit of the count value at the column direction writing address generation means with the horizontal selection signal so as to sort the addresses for the storage area to two groups for the row direction and column direction.

According to still another embodiment of a sub-screen data storage control unit, the address division means include a row address division means to sort writing addresses for the row direction sent from the row direction writing address generation means and a column address division means to sort writing addresses for the column direction sent from the column direction writing address generation means.

According to a further preferred embodiment of a sub-screen data storage control unit, each of the address division means comprises a first AND circuit which receives the most significant bit of the count value at the row direction writing address generation means or the column direction writing address generation means as well as reversed signal of the division ON/OFF signal to specify ON or OFF of division processing, a second AND circuit which receives the selection signal and the division ON/OFF signal and an OR circuit with two inputs which receive the outputs from the first and the second AND circuits.

Other objects, characteristics and effects of the present invention will be clarified in the detailed description below.

DESCRIPTION OF THE PREFERRED EMBODIMENT

Referring to the attached figures, preferred embodiments of the present invention will be described in detail below.

Figure 1:
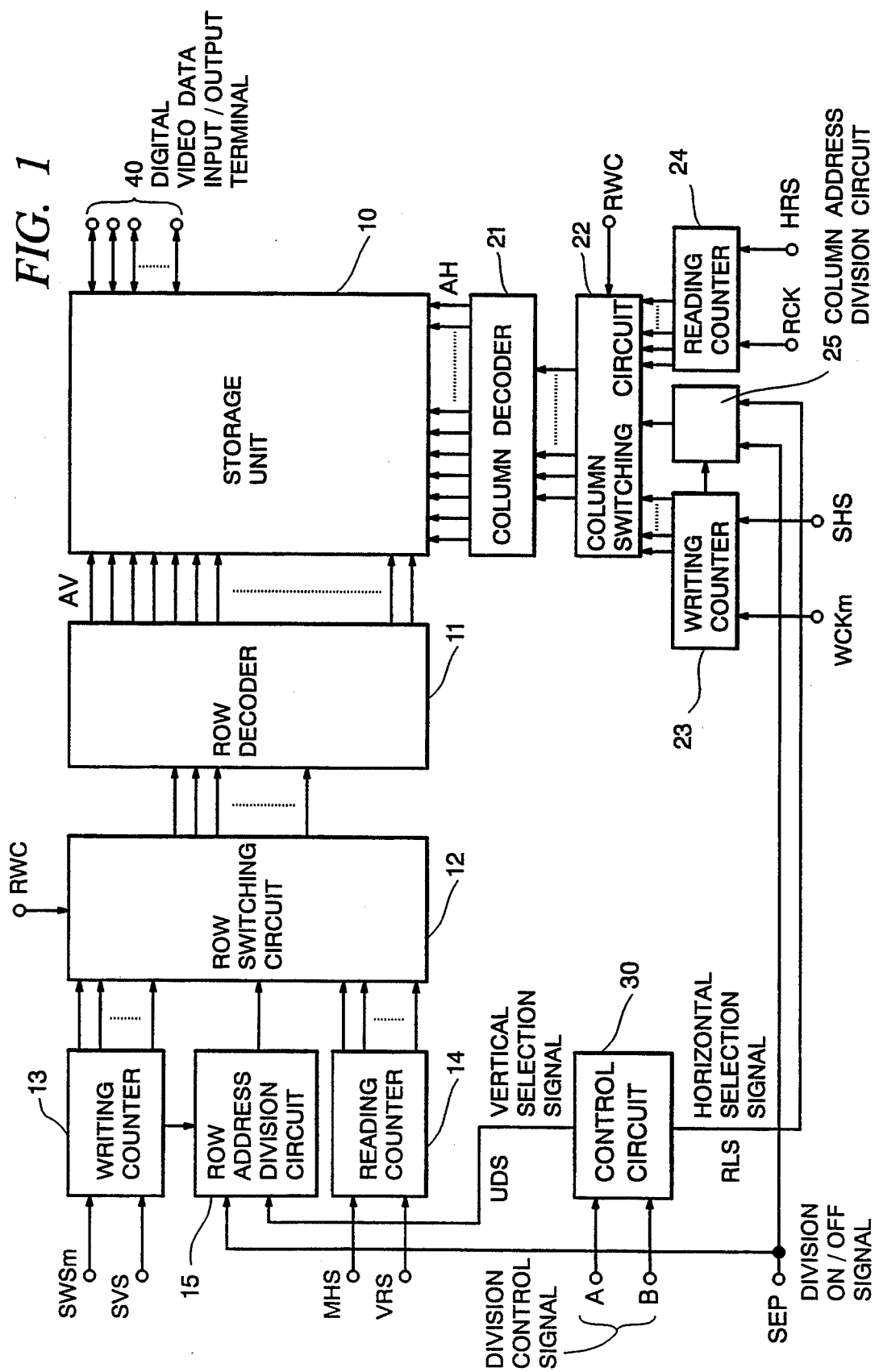
FIG. 1 is a block diagram to show the configuration of a storage control unit for sub-screen data according to a first embodiment of the present invention.

FIG. 1 is a block diagram to show the configuration of a storage control unit for sub-screen data according to a first preferred embodiment of the present invention. A storage control unit for sub-screen data according to this embodiment can have a sub-screen in the main screen divided into four sections (two vertically and two horizontally) and have different video data displayed in the four divided screens.

This storage control unit for sub-screen data comprises a reloadable storage unit 10 to store video signals for the sub-screen after digital conversion, a row decoder 11, a row switching circuit 12, a writing row counter 13, a reading row counter 14, a row address division circuit 15, a column decoder 21, a column switching circuit 22, a writing column counter 23, a reading column counter 24, a column address division circuit 25 and a control circuit For the storage 10, the address for the row direction is specified by the row decoder 11 and the address for the column direction is specified by the column decoder 21. The row decoder 11 decodes the output from the writing row counter 13 or the reading row counter 14 sent via the row switching circuit 12 so as to generate a row address signal AV. Similarly, the column decoder 21 decodes the output from the writing column counter 23 or the reading column counter 24 sent via the column switching circuit 22 so as to generate a column address signal AH. The storage 10 is provided with input/output terminals 40 for writing and reading of digital video data.

The row switching circuit 12 sends either of the data from the writing row counter 13 or the data from the reading row counter 14 to the row decoder 11 according to the switching signal RWC for switching between writing and reading. The column switching circuit 22 sends either of the data from the writing column counter 23 and the data from the reading column counter 24 to the column decoder 21 according to the writing/reading switching signal RWC. The switching signal RWC specifies data writing when its logical value is "1" and data reading when its logical value is "0".

In this storage control unit for sub-screen data, the writing row counter 13 counts the sub-screen writing signal SWSm obtained by dividing the sub-screen horizontal synchronizing signal SHS by 1/m when the sub-screen is divided into four sections. The writing column counter 23 counts the writing clock WCKm obtained by dividing the reading clock RCK by 1/m. In this embodiment, the sub-screen is divided into four: two sections in vertical and two in horizontal directions. Accordingly, the reduction ratio (1/m) has the following relation with the reduction ratio (1/n) for the case in FIG. 6 where the sub-screen is not divided.

$$1/m = (1/n) \times (\tfrac{1}{2})$$

Figure 6:
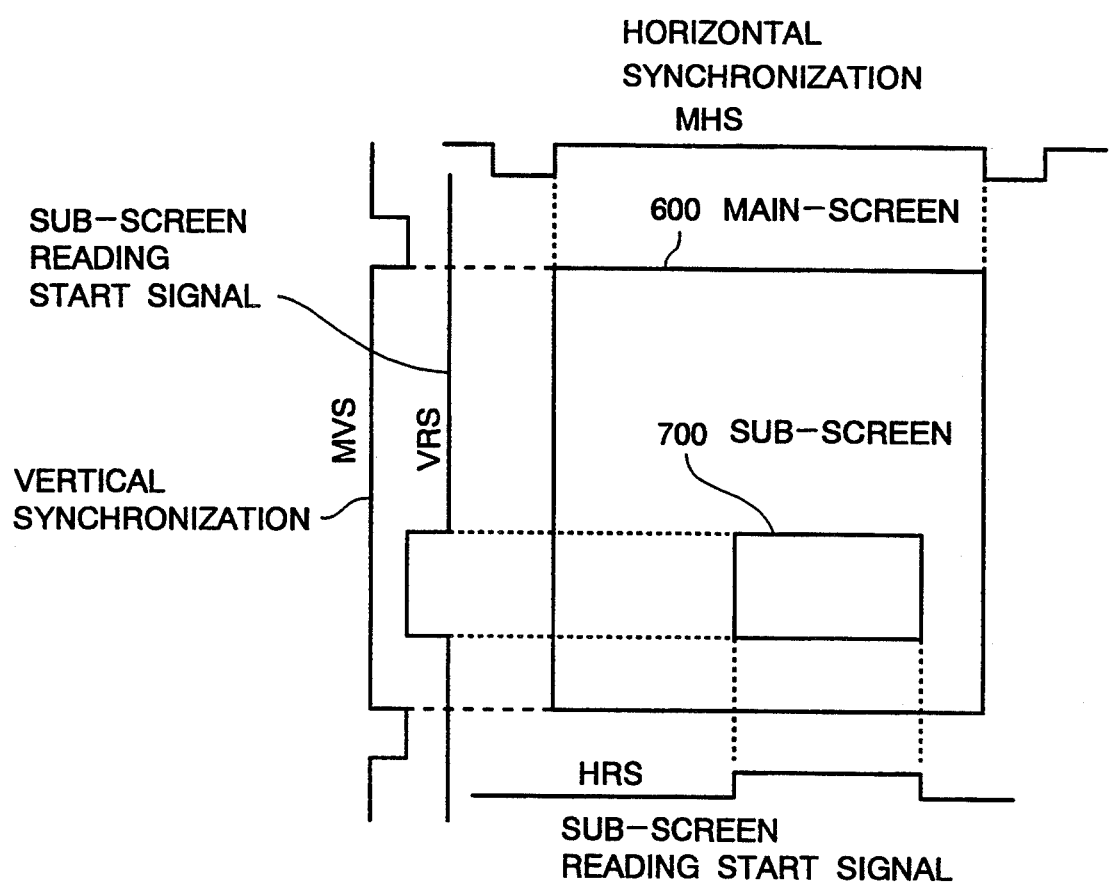
FIG. 6 is a diagram to show an example where a sub-screen is displayed in the main screen on a display unit.
Figure 7:
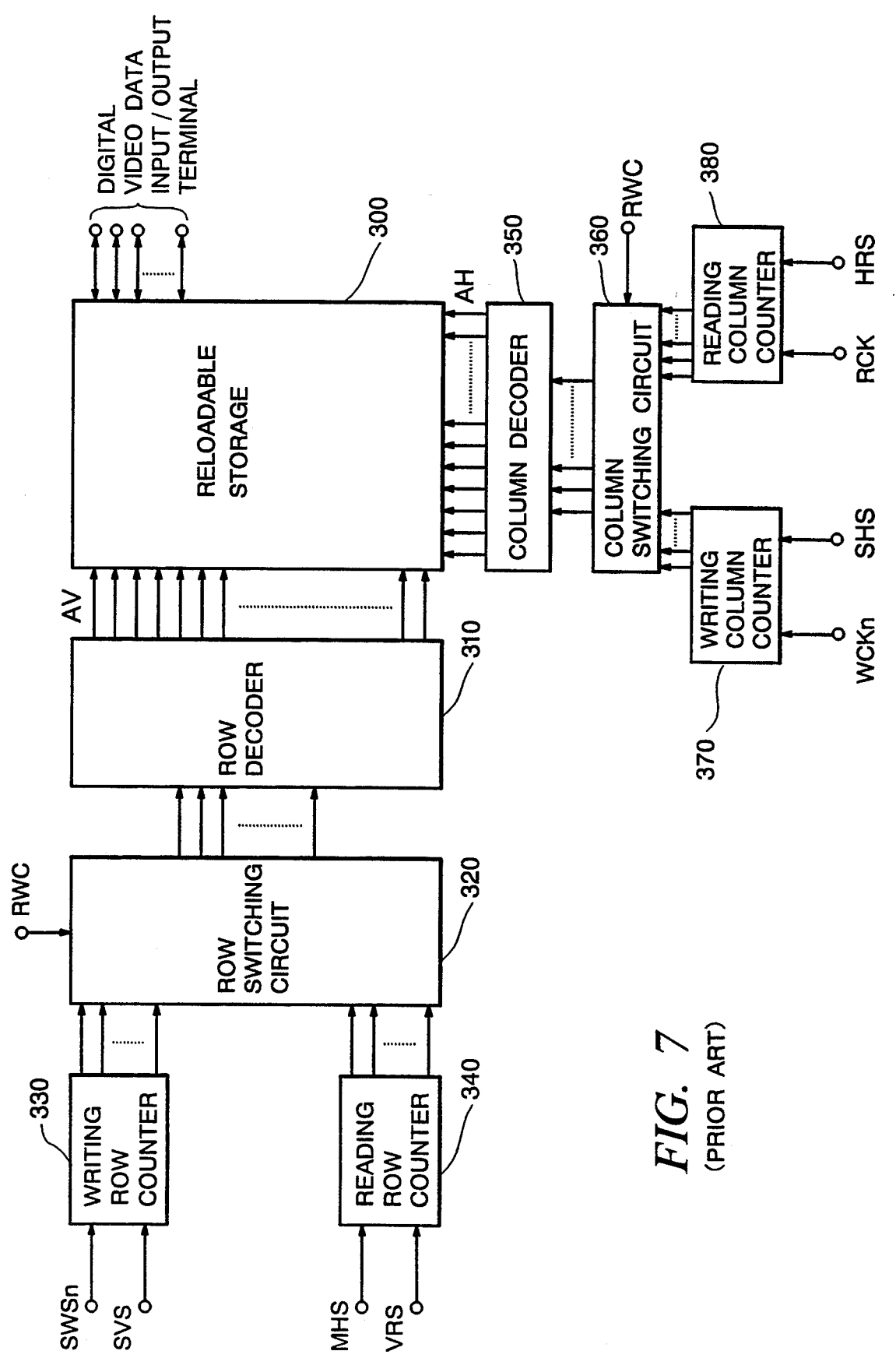
FIG. 7 is a block diagram to show the configuration of a conventional storage control unit for sub-screen data and FIG. 8 is a block diagram to show a specific configuration of a switch circuit and a row counter used in a storage control unit for sub-screen data.
Figure 8:
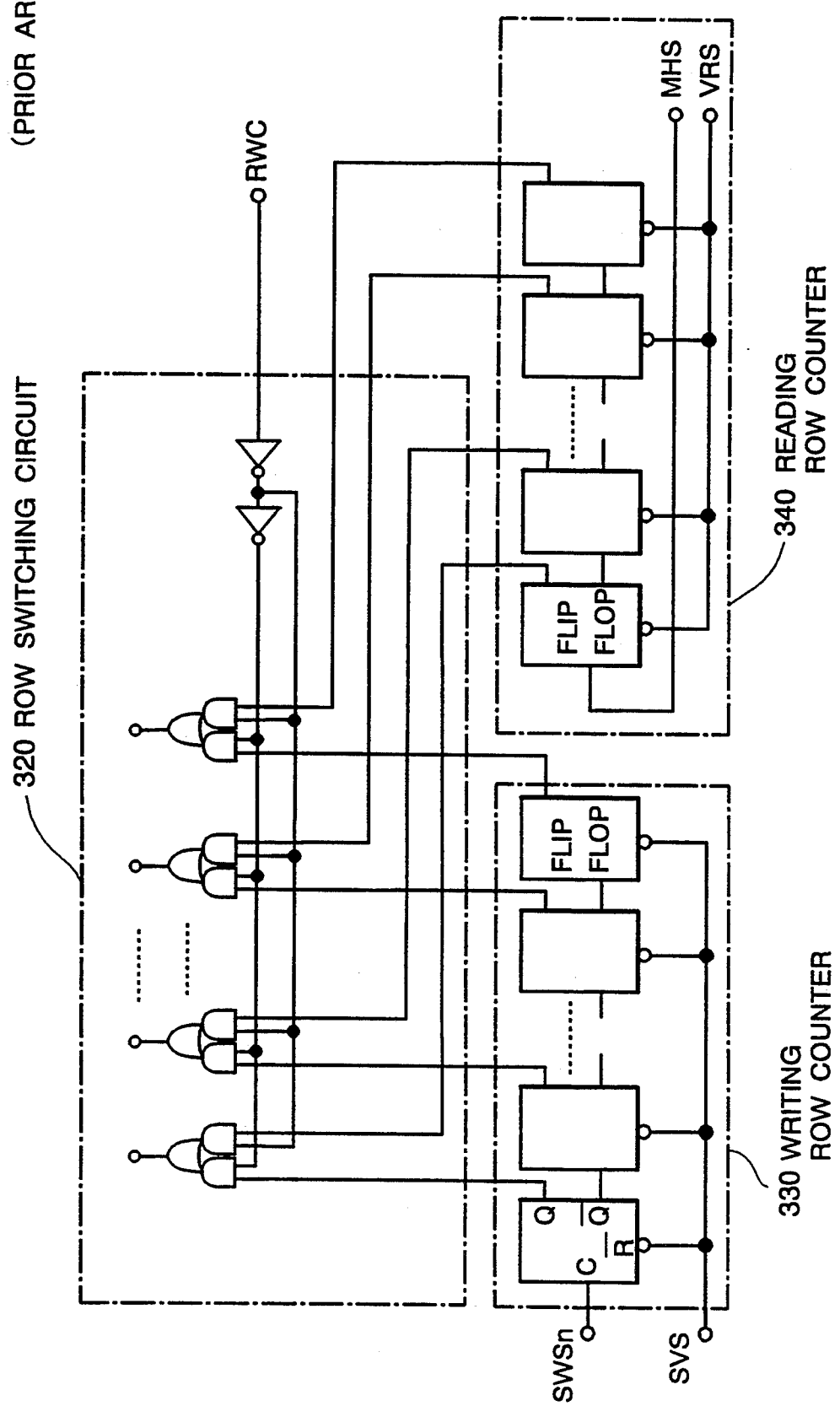

If the sub-screen is not divided as in the conventional case in FIG. 6, the writing row counter 13 counts the sub-screen writing signal SWSn obtained by dividing the sub-screen horizontal synchronizing signal SHS by the reduction ratio (1/n) for the sub-screen; and the writing column counter 23 counts the writing clock WCKn obtained by dividing the reading clock RCK by 1/n.

On the other hand, when data in the storage 10 is read for sub-screen display, the reading row counter 14 counts the horizontal synchronizing signal MHS for the main screen and the reading column counter 24 counts the reading clock RCK.

The row address division circuit 15 sorts row addresses into upper addresses and lower addresses so as to separately write the applicable digital video data for the upper or the lower section in the storage area of the storage 10, when the sub-screen is vertically divided into two sections. The column address division circuit 25 sorts column addresses into left addresses and right addresses so as to separately write the applicable digital video data for the left or the right section in the storage area of the storage 10.

The row address division circuit 15 and the column address division circuit 25 receive the division ON/OFF signal SEP to specify whether to divide the sub-screen and the vertical selection signal UDS or horizontal selection signal RLS from the control circuit 30. The division ON/OFF signal SEP specifies division of the sub-screen when it has "1" as its logical value and specifies no division when it has "0".

Figure 3:
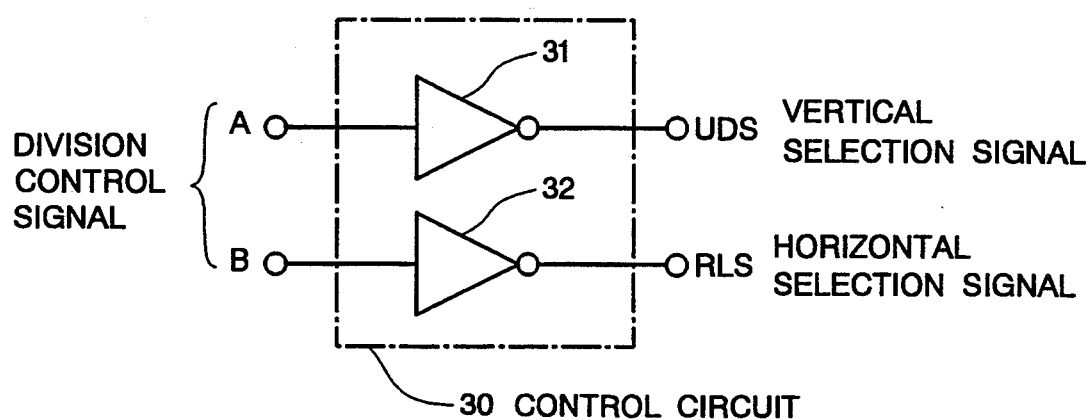
FIG. 3 is a block diagram to show a specific example of a control circuit in a storage control unit for screen data as shown in FIG. 1.

The control circuit 30 is a circuit to specify one of the four storage sections of the storage 10 divided into four corresponding to the division of the sub-screen, when digital video data is written to the storage 10. The control circuit 30 may be, for example, a simple circuit provided with two inverters 31 and 32 to output the vertical selection signal UDS and the horizontal selection signal RLS by reversing the division control signal A and B sent from a display controller in a display unit as shown in FIG. 3. The division control signal A is a signal to control division in vertical direction. The vertical selection signal UDS is a signal to specify the upper or lower section from the two sections divided in row direction in the storage 10; it specifies the upper section when it has "0" as the logical value and the lower section when it has "1" as the logical value. The horizontal selection signal RLS is a signal to specify the left or right section from the two sections divided in column direction in the storage 10; it specifies the left section when it has "0" as the logical value and the right section when it has "1" as the logical value.

Figure 2:
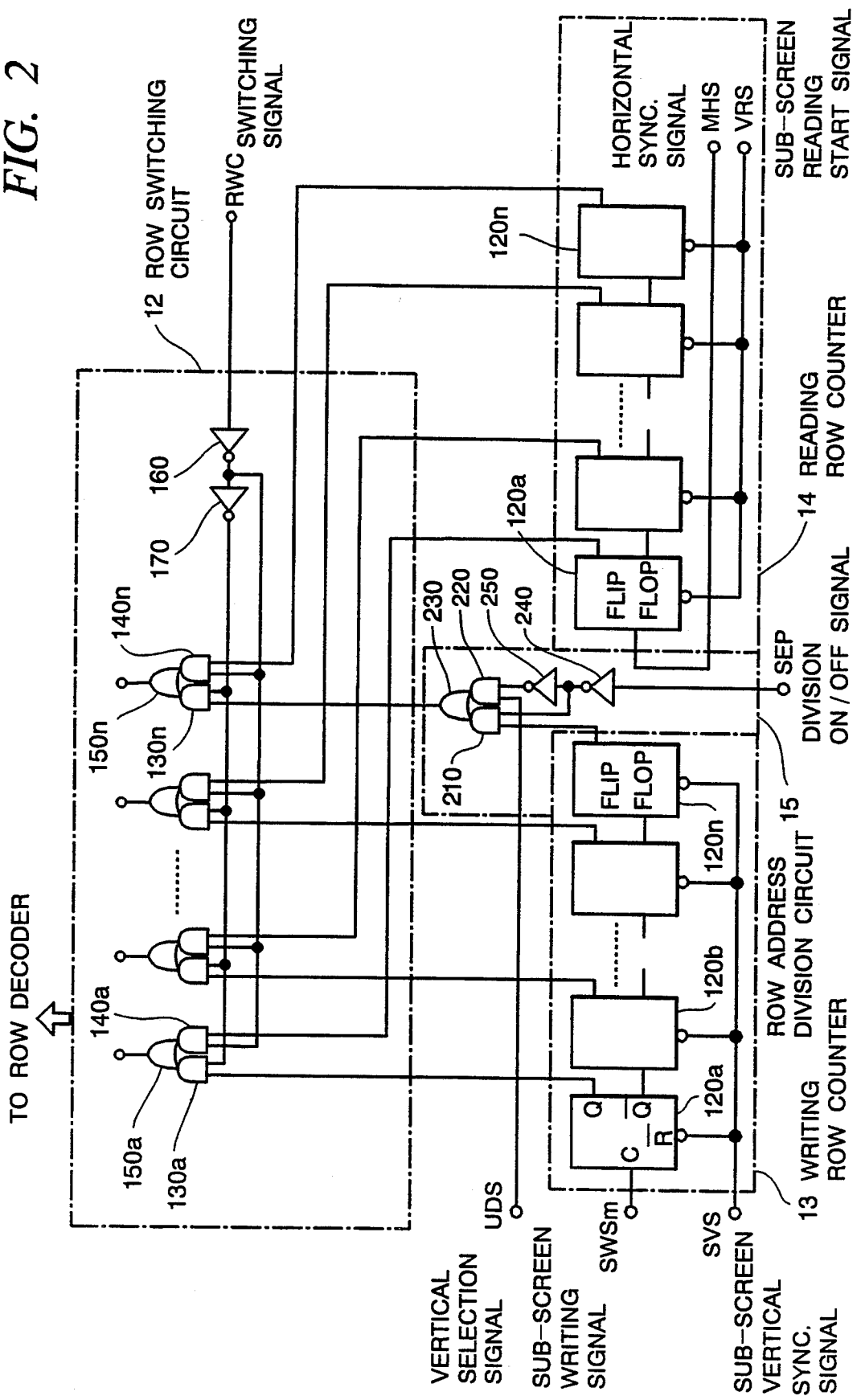
FIG. 2 is a block diagram to show a specific configuration example of a storage control unit for sub-screen data with a switching circuit, a row counter and an address division circuit.

FIG. 2 shows a specific configuration example of a storage control unit as described above with a row switching circuit 12, a writing row counter 13, a reading row counter 14 and a row address division circuit 15. In the figure, both the writing row counter 13 and the reading row counter 14 have a series of flip-flops 120a to 120n.

The clock terminal of the flip-flop 120a at the first stage of the writing row counter 13 receives the sub-screen writing signal SWSm (signal obtained by dividing the sub-screen horizontal synchronizing signal SHS by 1/m). The reset terminals of the flip-flops receive the sub-screen vertical synchronization signal SVS with the output Q sent to one of the input terminals at the AND circuits 130a to 130n in the row switching circuit 12. The clock terminal of the flip-flop 120a at the first stage of the reading row counter 14 receives the main screen horizontal synchronizing signal MHS. The reset terminals of the flip-flops receive the sub-screen reading start signal VRS with the output Q sent to one of the input terminals at the AND circuit 140 of the row switching circuit 12.

The row switching circuit 12 is provided with AND circuits 130a to 130n, AND circuits 140a to 140n and OR circuits 150a to 150n which receive the outputs from these two groups of AND circuits, as well as inverters 160 and 170. The other input terminals of the AND circuits 130a to 130 receive the switching signal RWC sent via the inverters 160 and 170, and the other input terminals of the AND circuits 140a to 140n receive the reversed signal of the switching signal RWC supplied from the inverter 160.

The row address division circuit 15 comprises two AND circuits 210 and 220, an OR circuit 230 receiving the outputs from the two AND circuits, and two inverters 240 and 250. The AND circuit 210 receives the output Q from the flip-flop 120n at the final stage of the writing row counter 13 and the reversed signal of the division ON/OFF signal SEP. The AND circuit 220 receives the vertical selection signal UDS and the division ON/OFF signal SEP. The outputs from the AND circuits 210 and 220 are sent to the OR circuit 230 and the output from the OR circuit 230 is sent to the AND circuit 130n corresponding to the most significant bit of the row switching circuit 120.

FIG. 2 shows an example of specific configurations for the row switching circuit 12, the writing row counter 13, the reading row counter 14 and the row address division circuit 15 alone. However, the basic configuration is almost the same for the column switching circuit 22, a writing column counter 23, a reading column counter 24 and a column address division circuit 25 except for the signal to be input. The column address division circuit 25 receives the horizontal selection signal RLS.

Still referring to FIG. 2, suppose the division ON/OFF signal SEP has the logical value "1" (for division), the switching signal RWC has the logical value "1" (for specification of sub-screen data writing) and the vertical selection signal UDS has the logical value "0" (for specification of the upper section in the storage area 10a), for example. In this case, the logical value "0" is always sent to the most significant bit of the row switching circuit 12.

The digital video data writing operation of the storage control unit for sub-screen data according to this embodiment is described now.

When the sub-screen is not to be divided, the division ON/OFF signal SEP has the logical value "0". Then, the row address division circuit 15 naturally has the AND circuit 220 output the logical value "0". The AND circuit 210 receives the reversed signal of the division ON/OFF signal SEP, i.e. the logical value "1". This causes the OR circuit 230 to output the data sent from the flip-flop 120n at the final stage of the writing row counter 13 as it is. At this time, the writing row counter 13 counts the sub-screen writing signal SWSn obtained by dividing the sub-screen horizontal synchronizing signal SHS by the reduction ratio (1/n). The writing column counter 23 counts the writing clock WCKn obtained by dividing the reading clock RCK by the reduction ratio (1/n). To the area in the storage 10 defined by the row address and the column address obtained by decoding these counted values with the row decoder 11 and the column decoder 21, the digital video data obtained through digital conversion of video signals for the sub-screen are written. Thus, when the sub-screen is not divided, the data writing operation for the storage 10 is exactly the same as that for a conventional unit shown in FIG. 6.

If the sub-screen is to be divided into four sections, the writing row counter 13 is reset by the sub-screen vertical synchronizing signal SVS and counts the sub-screen writing signal SWSm obtained by dividing the sub-screen horizontal synchronizing signal SHS by 1/m.

At this time, the division ON/OFF signal SEP takes the logical value "1", the AND circuit 210 at the row address division circuit 15 receives the logical value "0" as reversed signal and the output from the flip-flop 120n on the final stage of the writing row counter 13 is masked. Thus, the output from the flip-flop 120n at the final stage of the writing row counter 13 is not output to the row switching circuit 12.

Since the AND circuit 220 at the row address division circuit 15 receives the division ON/OFF signal SEP (logical value "1"), the logical value of the vertical selection signal UDS is sent as it is to the most significant bit of the row switching circuit 12 via the OR circuit 230. Specifically, when the vertical selection signal UDS has the logical value "0" and specifies the upper section of the storage area 10a in the storage 10, the output from the AND circuit 220 becomes the logical value "0" and the most significant bit of the row switching circuit 12 always takes the logical value "0". As a result, the row address signal AV obtained by decoding the output from the row switching circuit 12 with the row decoder 11 specifies the addresses for the upper section of the storage area in the storage 10 among the two sections divided in row direction. When the vertical selection signal UDS has the logical value "1" and specifies the lower section of the storage area 10a in the storage 10, the output from the AND circuit 220 becomes the logical value "1" and the most significant bit of the row switching circuit 12 always takes the logical value "1". As a result, the row address signal AV obtained by decoding the output from the row switching circuit 12 with the row decoder 11 specifies the addresses for the lower section of the storage area in the storage 10 among the two sections divided in row direction.

Therefore, digital video data for the sub-screen are written to the a half of the storage 10 as specified by the vertical selection signal UDS.

The writing column counter 23 and the column address division circuit 25 operate as described above. Specifically, the column decoder 21 outputs a column address signal AH only for either of the right or left section as specified by the horizontal selection signal RLS.

Thus, with the row address signal AV for either upper or lower section and the column address signal AH for either of the left or right section, one of the four sections in the storage area 10a of the storage 10 can be specified for writing of the sub-screen digital video data.

As describe above, the storage control unit for sub-screen data according to this embodiment can have the storage area 10a at the storage 10 divided into four sections, specify one of the sections using a combination of the vertical selection signal UDS and the horizontal selection signal RLS so that different digital video data can be written to the four different sections.

When the digital video signals thus written to the four sections in the storage 10 can be read out by setting the logical value "0" at the switching signal RWC. The count values at the reading row counter 14 and the reading column counter 24 are decoded by the row decoder 11 and the column decoder 21. This provides the row address signal AV and the column address signal AH, according to which the digital images are read out from the storage 10. This enables display of four different images on a sub-screen.

Figure 4:
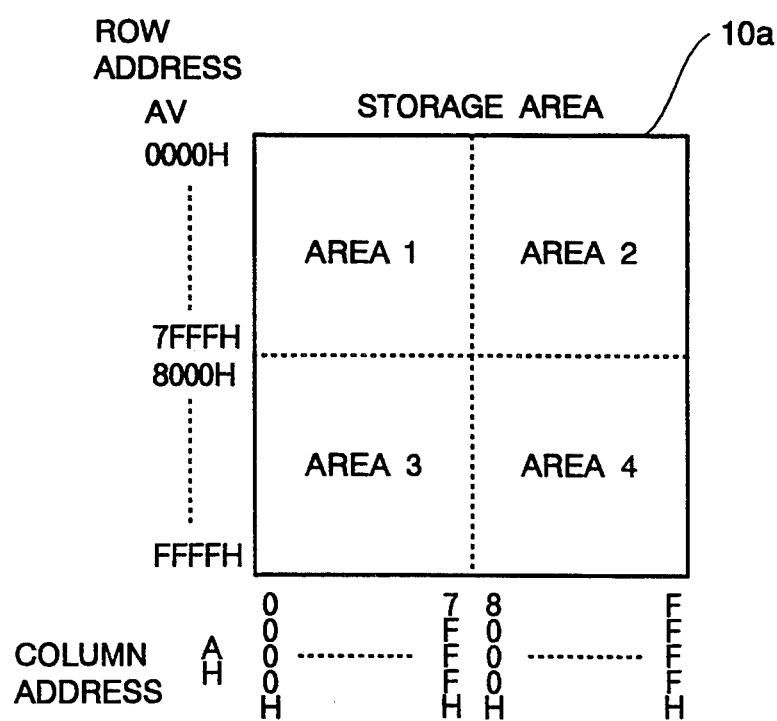
FIG. 4 is a diagram to show the storage area of the storage divided into sections.

FIG. 4 shows an example where the storage area 10a in the storage 10 is divided into four sections. There are four sections 1 to 4 in the figure. The ranges of the row address AV and the column address AH are from "0000H" to "FFFFH". When the vertical selection signal UDS has the logical value "0", the row address signal AV ranges only from "0000H" to "7FFFH". When the vertical selection signal UDS has the logical value "1", the row address signal AV ranges only from "8000H" to "FFFFH". Thus, the sections 1 to 4 can be selectively specified for data writing.

Figure 5:
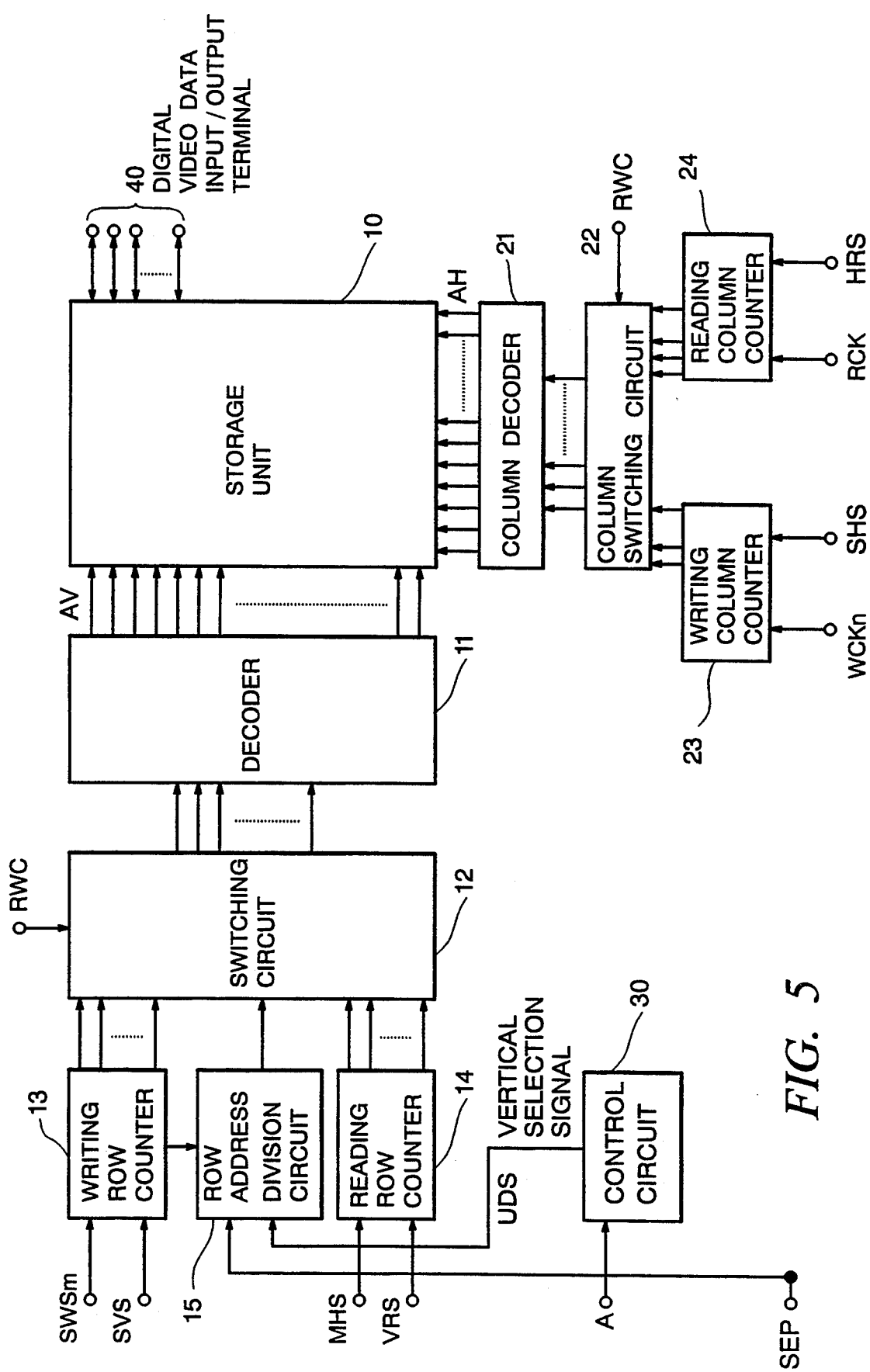
FIG. 5 is a block diagram to show the configuration of a storage control unit for sub-screen data according to a second embodiment of the present invention.

FIG. 5 is a block diagram to show the configuration of a sub-screen data storage control unit according to a second embodiment of the present invention. In this embodiment, the sub-screen is divided in vertical direction only—without any division in horizontal direction. The control circuit 30 outputs the vertical selection signal UDS from the division control signal A for the row direction. The division ON/OFF signal SEP is supplied to the row address division circuit 15 only. Specific configurations for a row switching circuit 12, a writing row counter 13, a reading row counter 14 and a row address division circuit 15 are exactly the same as in FIG. 2. The operation is also the same as in the unit according to the first embodiment in FIG. 1. In this second embodiment, corresponding to the sub-screen vertically divided into two sections, the storage area 10a of the storage 10 is vertically divided into two sections so that different digital image data can be written to the different sections each of which can be specified by the vertical selection signal UDS. This enables display of two different images in a sub-screen.

According to this invention, a display unit for a television or a computer can have a sub-screen in the main screen divided into a plurality of sections with displaying different images on the different divided sections simultaneously.

Obviously, various modifications can be made to the above embodiments. The storage area 10a of the storage 10 is divided into four or two sections in the above description, but the storage area 10a can be divided into much more sections. For example, the storage area 10a can be divided into 16 sections with division into four sections for the row direction and division into four sections for the column direction. In this case, the upper two bits of the writing counters are replaced with the two-bit selection signals at the address division circuits.

It is intended to cover in the appended claims all such modifications and variations as fall within the true spirit and scope of the present invention.

What is claimed is:

1. A sub-screen data storage control unit for digital video data to be selectively displayed on a sub-screen in a main screen of a display unit comprising:
   a storage means 10 for storing digital video data for said sub-screen, said storage means including a plurality of divided sections for said sub-screen;
   a writing address generation means for counting the horizontal synchronizing signal for said sub-screen divided corresponding to the vertical reduction ratio of said sub-screen and generating writing addresses for the row direction of said storage means by decoding the counted values;
   another writing address generation means for counting the clock obtained by dividing the reading clock corresponding to the horizontal reduction ratio of said sub-screen and generating writing addresses for the column direction of said storage means by decoding the counted values;
   a reading address generation means for counting the horizontal synchronizing signal for said main screen and generating reading addresses for the row direction of said storage means by decoding the counted values, another reading address generation means for counting said reading clock and generating reading address for the column direction of said storage means by decoding the counted values;
   a selection signal generation means for generating selection signals to specify one of the divided sections in the storage area of said storage means divided corresponding to the division of said sub-screen; and
   an address division means for providing at least one of the row direction writing address and the column direction writing address sent respectively from said row direction writing address generation means and said column direction writing address generation means to each of said divided sections in said storage area according to the section selection signal from said selection signal generation means.

2. A sub-screen data storage control unit of claim 1 wherein said address division means sorts said row direction writing address and said column direction writing address by replacing with said section selection signal the significant bits of said count values at said row direction writing address generation means or said column direction writing address generation means.

3. A sub-screen data storage control unit of claim 1 wherein said selection signal generation means generates a vertical selection signal to specify one of the sections obtained from row direction division of said storage area and a horizontal selection signal to specify one of the sections obtained from column direction division of said storage area, and said address division means replaces the significant bit of said count value at said row direction writing address generation means with said vertical selection signal and also replaces the significant bit of said count value at said column direction writing address generation means with said horizontal selection signal.

4. A sub-screen data storage control unit of claim 1 wherein each of said address generation means comprises a counter and a decoder to decode the counter values.

5. A sub-screen data storage control unit of claim 1 wherein said selection signal generation means generates a one-bit vertical selection signal to specify one of the two sections obtained from row direction division of said storage area and a one-bit horizontal selection signal to specify one of the two sections obtained from column direction division of said storage area, and said address division means replaces the most significant bit of said count value at said row direction writing address generation means with said vertical selection signal and the most significant bit of said count value at said column direction writing address generation means with said horizontal selection signal so as to sort the addresses for said storage area to two groups for the row direction and column direction.

6. A sub-screen data storage control unit of claim 5 wherein each of said address division means comprises a first AND circuit which receives the most significant bit of said count value at said row direction writing address generation means or said column direction writing address generation means as well as reversed signal of the division ON/OFF signal to specify ON or OFF of division processing, a second AND circuit which receives said selection signal and said division ON/OFF signal, and an OR circuit with two inputs which receive the outputs from said first and the second AND circuits.

7. A sub-screen data storage control unit of claim 1 wherein said address division means include a row address division means to sort writing addresses for the row direction sent from said row direction writing address generation means, and a column address division means to sort writing addresses for the column direction sent from said column direction writing address generation means.

8. A sub-screen data storage control unit for digital video data to be displayed on one or more sub-screens in a main screen of a display unit comprising:
   a storage means for storing digital video data for said sub-screen, said storage means having a plurality of divided sections in the storage area of said storage means divided corresponding to the division of said sub-screen and respectively adapted to store video data independent of those stored in other sections;
   a writing address generation means for counting the horizontal synchronizing signal for said sub-screen divided corresponding to the vertical reduction ratio of said sub-screen and generating writing addresses for the row direction of said storage means by decoding the counted values;

another writing address generation means for counting the clock obtained by dividing the reading clock corresponding to the horizontal reduction ratio of said sub-screen and generating writing addresses for the column direction of said storage means by decoding the counted values;

a reading address generation means for counting the horizontal synchronizing signal for said main screen and generating reading addresses for the row direction of said storage means by decoding the counted values, another reading address generating means for counting said reading clock and generating reading address for the column direction of said storage means by decoding the counted values;

a selection signal generation means for generating section selection signal for each of said sub-screens to specify one of the divided sections for reading out the video data stored therein in order to reproduce the video image on the corresponding sub-screen; and an address division means for providing at least one of the row direction writing address and the column direction writing address sent respectively from said row direction writing address generation means and said column direction writing address generation means to each of said divided sections in said storage area according to the section selection signal from said selection signal generation means.

* * * * *